United States Patent [19]
Batzar

[11] 3,954,496
[45] May 4, 1976

[54] PREPARATION OF DENSE SILICA-ENCAPSULATED ALUMINUM FLAKE PIGMENT TREATED WITH A CARBOXYLIC CHROMIC CHLORIDE

[75] Inventor: Kenneth Batzar, Piscataway, N.J.

[73] Assignee: E. I. Du Pont de Nemours and Company, Wilmington, Del.

[22] Filed: Oct. 9, 1974

[21] Appl. No.: 513,308

[52] U.S. Cl. ............................ 106/308 B; 106/302; 106/288 B
[51] Int. Cl.² ........................................... C09C 1/20
[58] Field of Search ............. 106/288 B, 302, 308 B

[56] References Cited
UNITED STATES PATENTS

| | | | |
|---|---|---|---|
| 2,524,803 | 9/1950 | Iler | 106/308 B |
| 2,885,366 | 5/1959 | Iler | 106/308 B |
| 3,798,045 | 3/1974 | Jackson | 106/308 B |

*Primary Examiner*—Winston A. Douglas
*Assistant Examiner*—J. V. Howard

[57] ABSTRACT

Dense silica-encapsulated aluminum flake pigment in aqueous suspension is treated with a carboxylic chromic chloride. Such treated pigment is stabilized against gassing when in contact with water. Aqueous-based coating compositions containing such pigment exhibit improved storage stability.

9 Claims, No Drawings

PREPARATION OF DENSE SILICA-ENCAPSULATED ALUMINUM FLAKE PIGMENT TREATED WITH A CARBOXYLIC CHROMIC CHLORIDE

BACKGROUND OF THE INVENTION

Aluminum flake pigment is widely known for its ability to impart metallic luster to coating compositions in which it is used. Although aluminum flake is used in many different decorative applications, the metallic luster characteristic of this pigment is particularly desirable in automotive finishes. While the aluminum flake pigments have proven readily useful in coating compositions based on organic solvent systems, difficulties have been encountered in attempting to use the same pigments in aqueous solvent systems, e.g., solvent systems containing about 80 percent water. It will be understood that aqueous coating systems are becoming more and more attractive as a means of eliminating the problems of pollution control and safety which are inherent with the organic solvent systems.

In aqueous medium, aluminum flake pigment can undergo reaction with water with accompanying evolution of hydrogen gas. This phenomenon, known as "gassing," can be especially troublesome when the pigment is stored in aqueous medium in sealed containers. Gassing can be lessened, at least to some extent, by encapsulating the aluminum flakes with dense amorphous silica. However, since the silica coating is conventionally applied to aluminum flake in aqueous suspension, e.g., as per Iler U.S. Pat. No. 2,885,366, gassing can occur even during the preparation or isolation of encapsulated flake. In any event, the quantity of silica usually necessary to impart even partial resistance to gassing, can dull the aluminum flake to such an extent as to render it undesirable for finishes requiring metallic luster.

SUMMARY OF THE INVENTION

In accordance with the invention it has been found that dense silica-encapsulated aluminum flake pigments can be treated with a carboxylic chromic chloride so that during preparation or when incorporated into coating compositions, the resulting pigment will have high resistance to gassing in contact with water. This invention provides for an improved process for the preparation of dense silica-encapsulated aluminum flake pigment, which is prepared by precipitating dense silica from an aqueous suspension of finely divided aluminum flake pigment which contains active silica, wherein the improvement comprises treating said silica-encapsulated pigment with a carboxylic chromic chloride selected from the group consisting of methacrylato chromic chloride, stearato chromic chloride and myrisato chromic chloride. For applications where coating compositions containing the treated aluminum flake pigment are exposed to high humidity, methacrylato chromic chloride is preferred because it imparts humidity resistance to the pigment.

Preparing treated silica-encapsulated aluminum flake pigments according to this invention permits the use of far less silica coating than is necessary on untreated pigment, while achieving much higher resistance to gassing. For example, it has been found that untreated silica-encapsulated aluminum flake pigment containing as high as 10% by weight of $SiO_2$ produces about ten times as much gas in aqueous medium as the same amount of treated pigment containing about only 4 percent by weight of $SiO_2$. Since silica coatings tend to decrease the luster of aluminum flake pigment, the use of lesser amounts of silica, while achieving high resistance to gassing, is commercially desirable.

Furthermore, gassing during the preparation or isolation of the silica-encapsulated aluminum flake pigment can be alleviated by treating the pigment immediately following preparation and prior to isolation from aqueous suspension in which it is prepared. In this way resistance to gassing is imparted to the encapsulated pigment before long exposure to water in the aqueous suspension and before the pigment is subject to large quantities of water during isolation. In addition, resistance to gassing can be imparted to silica-encapsulated aluminum flake pigment which has been previously isolated by treatment with a carboxylic chromic chloride according to the invention.

The amount of carboxylic chromic chloride used should be from about 2 percent to about 20 percent by weight, preferably about 4 percent to about 8 percent by weight, based on the weight of the pigment, to effectively inhibit gassing. The carboxylic chromic chloride is advantageously applied while the pigment is dispersed in an aqueous medium. Thus the chromic chloride, being water soluble, can be added to the suspension for purposes of its absorption onto the pigment particles. In any case it is preferable that the temperature of the aqueous dispersion does not exceed about 60°C. or otherwise excessive hydrolysis of the chromic chloride can occur with the result that the desired improvement may not be satisfactorily achieved. Excessively high pH values, i.e., of 11 or greater, should likewise be avoided in order to maximize the nature of the improvement.

The carboxylic chromic chlorides utilized in the process of this invention are water soluble complex chromium compounds of the Werner type. The nomenclature applied to them is described fully in U.S. Pat. Nos. 2,273,040 and 2,356,161. By deleting the suffix "-ic" from the name of the carboxylic acid and adding the suffix "-ato" a system of naming the acido group coordinated with the chromium and hence for naming the chromium complexes is provided. The carboxylic chromic chlorides are readily prepared by the method of Iler U.S. Pat. No. 2,524,803 in which a basic chloride, dissolved in a monohydric aliphatic alcohol, is reacted with a carboxylic acid.

The amount of dense silica utilized in the process of the invention should be from about 2 percent to about 30 percent, preferably about 4 percent to about 10 percent, based on the pigment weight, depending upon the degree of metallic luster or reflectivity desired in the final encapsulated pigment.

Any aluminum flake pigment of the type used in the manufacture of aluminum paints can be used. The class of dense silica-encapsulated aluminum flake pigment to which the invention is applicable is illustrated by Iler U.S. Pat. No. 2,885,366, especially Example 14. The disclosure of Iler is herein incorporated by reference in respect of the various silica precipitation techniques and the product characteristics.

Various methods are known for applying silica coating, viz. (1) simultaneous but separate addition of a soluble silicate and a mineral acid, (2) addition of a silicic acid solution freshly prepared by deionizing a sodium silicate solution with a cation-exchange resin, and (3) addition of sodium silicate solution to the pigment slurry, followed by addition of sulfuric acid.

There are certain critical conditions which must be observed during the treatment of any of these three methods. To obtain the desired dense silica coatings on the deagglomerated pigment particles, the pH of the slurry at the point of addition of the silica-forming ingredients to the mixture must be at least about pH 6.0 and preferably in the range of 9.0 to 9.5. Furthermore, the temperature at this same point must be at least above 60°C. and preferably above 75°C. In many cases it is preferred that the temperature be about 90°C. When the pH is allowed to go below about 6.0 or the temperature significantly below 60°C., there is a pronounced tendency for the silica to precipitate in an undesired porous, gel-like structure. The above-mentioned methods all result in the deposition of at least the major part of the silica as the desired amorphous continuous film on the surface of the pigment particles in the slurry.

These methods of forming the silica layer on the surface of the aluminum flake pigment particles have one feature in common, viz. that the silica is added as "active silica." When sodium silicate is acidified, silicic acid is formed, probably initially as orthosilicic acid, $Si(OH)_4$. However, this product tends to polymerize by the reaction of two silanol groups (-Si-OH) to form a siloxane group (-Si-O-Si-). Under acidic conditions, this polymerization proceeds rapidly until a predominant proportion of the silanol groups present have been used up in the formation of siloxane bonds. The polymer thus formed has a high molecular weight and is defined as "inactive." Under the conditions of moderate alkalinity used in the examples below, there is a low degree of polymerization wherein the condensation between silanol groups has proceeded to only a limited extent leaving the silica in an "active" form which readily deposits on the surface of the aluminum flake pigment particles present. It is not intended to imply that there is no polymerization nor that the process of polymerization is completely inhibited but, under the conditions specified, the silica is in a state of low polymerization and, thus "active" for a sufficient time to bring about deposition in the dense, amorphous form on the surface of the aluminum flake pigment particles. This term "active silica" has been more precisely defined elsewhere (see Rule U.S. Pat. No. 2,577,484 for instance), but the conditions specified above are adequate for the purposes of this invention.

The treated silica-encapsulated aluminum flake pigments prepared according to the process of this invention can be used effectively in conventional coating compositions having an organic solvent system, but offer the greatest advantages in coating compositions having an aqueous solvent system. Aluminum flake pigment destined for use in aqueous-based coating compositions is often stored and shipped in the form of an aqueous dispersion, which is subsequently mixed with additional water and conventional film-forming components to provide a final aqueous-based coating composition. A typical aqueous dispersion of aluminum flake pigment may contain about 15 percent to 35 percent by weight of pigment, about 5 percent to 20 percent by weight of resinous paint vehicle, such as a low-molecular-weight acrylic interpolymer resin, and about 40 to 70 percent by weight of water, based on the weight of the total dispersion.

The following examples, in which parts and percentages are by weight unless otherwise indicated, further illustrate the practice of the invention.

EXAMPLE 1

Fifty grams of a commercially available aluminum flake pigment, having a particle size of about 2–50 $\mu$, is washed free of mineral spirits with butyl cellosolve. The pigment is washed into a conventional high-shear blending device using 500 ml of an aqueous solution containing 12.0 g sodium silicate and 0.01 g of nonylphenoxy poly-(ethyleneoxy)ethanol, a commercially available surfactant sold under the trade name "Tergitol" NP-14, to aid in dispersing the mixture. The resulting mixture is blended at low speed for 5 minutes, then transferred to a 4-neck round-bottom flask equipped with a stirrer, gas inlet tube, condenser and thermometer. The above dispersion procedure is repeated to provide an additional 50 g of suspended aluminum flake pigment which is placed in the flask to give a total of 100 g of suspended pigment.

The suspension is stirred at about 200 rpm for 45 minutes while being gradually heated to 95°C. The temperature is maintained at 95°C. for 75 minutes as $CO_2$ is passed over the surface of the suspension at a rate of about 18 cc/min. Ice is then added to the suspension to lower the temperature to 45°C. The pH of the cooled suspension is 8.0–8.3. The treating agent is a 29 percent solution in isopropanol of methacrylato chromic chloride. Twenty-four grams of the treating solution is slurried in 25 ml of water and added with stirring to the suspension at a uniform rate to thus give 8 percent methacrylato chromic chloride based on the aluminum flake pigment. The solution is stirred for two minutes. The pH of the suspension is adjusted to 8.0 by the use of aqueous 5 percent NaOH. The suspension is stirred for 15 minutes followed by readjustment of the pH to 8.0 with 5 percent NaOH. The suspension is filtered and washed with tap water until the resistivity is 5000 ohm/cm. The suspension is further washed four times with 300 ml butyl cellosolve each time. The product is dried prior to analysis and found by analysis to contain 4.1 percent $SiO_2$, dry basis.

To test the product for gassing in a typical aqueous-based dispersion, 4.6 g of the silica-encapsulated aluminum flake, dry basis, and 5.4 g of an aqueous solution containing about 50 percent of a low-molecular-weight (ca. 8000) carboxylic acrylic interpolymer formed by copolymerization of a mixture of 50 parts methyl methacrylate, 30 parts of butyl acrylate and 20 parts acrylic acid, which has thereafter been neutralized with N,N-diethyl-2aminoethanol, are added to 10 ml of water and thoroughly mixed. This dispersion is placed in a sealed container, equipped with a device for measuring the amount of gas which evolves from the composition, and held at 60°C. for 24 hours. During that time 3 ml of hydrogen gas evolves from the dispersion.

CONTROL

Fifty grams of aluminum flake pigment described above is cleaned with butyl cellosolve and then washed into a blending device using 500 ml of an aqoeus solution containing 48.5 g sodium silicate. The resulting mixture is blended at low speed for 5 minutes, then transferred to the round-bottom flask described above. This procedure is repeated to give an additional 50 g of suspended flake, which is placed in the flask.

The suspension is stirred at about 200 rpm for 45 minutes while being gradually heated to 95°C. The temperature is maintained at 95°C. for five hours as $CO_2$ is passed over the surface of the suspension at a rate of about 36 cc/min. The suspension is filtered and washed as above. The product is found by analysis to contain 10.2 percent $SiO_2$, dry basis.

The untreated product is tested for gassing according to the same procedure as used to test the treated product (described above) and is found to produce more than 30 ml of hydrogen gas during the testing period.

EXAMPLE 2

Fifty grams of the aluminum flake pigment of Example 1 is cleaned with butyl cellosolve, then washed into a blender using 500 ml of an aqueous solution containing 12.0 g sodium silicate. The resulting mixture is blended at low speed for 5 minutes, then tranferred to a round-bottom flask used in Example 1. The procedure is repeated to provide an additional 50 g of pigment which is placed in the flask.

The suspension is stirred at about 200 rpm for 45 minutes while being gradually heated to 95°C. The temperature is maintained at 95°C. for 75 minutes as $CO_2$ is passed over the surface of the suspension at a rate of about 18 cc/min. The suspension is then cooled to 55°C. after which half by volume of the slurry is removed.

The remaining suspension is cooled to 45°C. The pH of the cooled suspension is 8.0–8.3. The treating agent is a 29 percent solution in isopropanol of methacrylato chromic chloride. Twelve grams of the treating solution is slurried in 12.5 ml of water and added with stirring to the suspension at a uniform rate to give 8 percent methacrylato chromic chloride based on the aluminum flake pigment. The solution is stirred for two minutes. The pH of the suspension is adjusted to 8.0 by the use of aqueous 5 percent NaOH and stirred for 15 minutes more followed by readjustment of the pH to 8. The suspension is filtered and washed with tap water until the resistivity is 5000 ohm/cm. The suspension is further washed three times with 100 ml butyl collosolve each time. The product is dried prior to analysis and found by analysis to contain 5.4 percent $SiO_2$ dry basis.

The product is tested for gassing according to the procedure of Example 1 and is found to produce 4 ml of hydrogen gas during the 24-hour testing period.

CONTROL

Silica-encapsulated aluminum flake pigment is prepared following the above procedure up to the point of adding the treating agent. The suspension is cooled to 55°C., filtered, and washed with tap water until the resistivity is 5000 ohm-cm. The suspension is further washed three times with 100 ml butyl cellosolve each time. The product is analyzed and found to contain about 5.4 percent $SiO_2$, dry basis.

The product is tested for gassing according to the procedure of Example 1 and is found to produce more than 30 ml of hydrogen gas in 1 hour 45 minutes.

EXAMPLE 3

Following the procedure of Example 2, stearato chromic chloride is substituted for methacrylato chromic chloride. The product is found to contain about 5.6 percent $SiO_2$, dry basis.

The product is tested for gassing according to the procedure of Example 1 and found to produce 3 ml of hydrogen gas during the 24-hour testing period. The corresponding untreated product gassed more than 30 ml of hydrogen gas during the same period.

What is claimed is:

1. In a process for the preparation of a dense silica-encapsulated aluminum flake pigment by the steps of precipitating said dense silica from an aqueous suspension of finely divided aluminum flake pigment which contains active silica, the improvement for stabilizing said pigment against gassing when in contact with water, wherein a carboxylic chromic chloride is added to said silica-encapsulated aluminum flake pigment in an aqueous dispersion, said carboxylic chromic chloride being added in an amount from about 2% to about 20% by weight, based on said aluminum flake pigment.

2. Process according to claim 1 wherein the carboxylic chromic chloride is selected from the group consisting of methacrylato chromic chloride, stearato chromic chloride and myrisato chromic chloride.

3. Process according to claim 1 wherein the chromic chloride is methacrylato chromic chloride.

4. Process according to claim 1 wherein the chromic chloride is stearato chromic chloride.

5. Process according to claim 1 wherein the chromic chloride is added in an amount from about 4 to about 8 percent by weight, based on the aluminum flake pigment.

6. Process according to claim 1 wherein the temperature of said aqueous dispersion is not in excess of about 60°C. and the pH of said aqueous dispersion is not in excess of about 11.0.

7. Process according to claim 1 wherein the dense silica-encapsulated aluminum flake pigment contains from about 2 to about 30 percent by weight $SiO_2$, based on the weight of the dense silica-encapsulated aluminum flake pigment.

8. Process according to claim 1 wherein the dense silica-encapsulated aluminum flake pigment contains from about 4 to about 8 percent by weight $SiO_2$, based on the weight of the dense silica-encapsulated aluminum flake pigment.

9. A dense silica-encapsulated aluminum flake pigment prepared according to the process of claim 1.

* * * * *